(12) United States Patent
Kakui

(10) Patent No.: US 6,246,512 B1
(45) Date of Patent: Jun. 12, 2001

(54) OPTICAL AMPLIFIER

(75) Inventor: Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/465,772

(22) Filed: Dec. 17, 1999

Related U.S. Application Data

(60) Provisional application No. 60/147,042, filed on Aug. 3, 1999.

(51) Int. Cl.$^7$ ............................. H01S 3/00; H01S 3/133
(52) U.S. Cl. ..................... 359/337; 359/341; 359/161; 372/6; 372/34
(58) Field of Search ................................ 359/337, 161, 359/341; 372/6, 34

(56) References Cited

U.S. PATENT DOCUMENTS 4,906,949 * 3/1990 Pocholle et al. .................. 330/4.3
6,104,526 * 8/2000 Kakui ............................. 359/337

FOREIGN PATENT DOCUMENTS

| 4-11794 | 1/1992 | (JP) . |
| 4-99080 | 3/1992 | (JP) . |
| 8-5860 | 1/1996 | (JP) . |

\* cited by examiner

*Primary Examiner*—Mark Hellner
(74) *Attorney, Agent, or Firm*—McDermott, Will & Emery

(57) ABSTRACT

This is disclosed an optical amplifier comprising: an optical waveguide for amplifying signal light incident thereon and outputting thus amplified signal light while pumping light is being supplied; a transmission device, substantially cascaded to said optical waveguide, for transmitting therethrough the signal light with a predetermined transmission characteristic; pumping device for outputting the pumping light and supplying the pumping light to the optical waveguide; temperature detecting device for detecting a temperature of or near the optical waveguide; and control unit for controlling the transmission characteristic of the transmission device according to the temperature detected by the temperature detecting device.

5 Claims, 10 Drawing Sheets

OPTICAL AMPLIFIER

RELATED APPLICATIONS

This application claims priority from U.S. Provisional Patent Application No. 60/147,042, filed Aug. 3, 1999 which is incorporated herein by reference.

BACKGROUND OF THE INVENTION

1. Field of the Invention

The present invention relates to an optical amplifier which collectively amplifies signal light having a plurality of wavelengths in a WDM type optical transmission system.

2. Related Background Art

As optical communications are attaining a greater capacity and higher speed, studies and developments concerning wavelength division multiplex (WDM) transmission systems are being made. One of the most important optical devices in the WDM transmission systems is an optical amplifier which collectively amplifies signal light having a plurality of wavelengths. As such an optical amplifier, an optical fiber amplifier (EDFA: Er-Doped Fiber Amplifier) using an amplifying optical fiber (EDF: Er-Doped Fiber) doped with Er (erbium) element has conventionally been employed.

Such an optical amplifier is provided in each repeater in an optical transmission system. As a consequence, if its gain characteristic (gain deviation or gain slope) is inferior, then, even though a certain wavelength of signal light among a plurality of wavelengths may reach a receiving station with sufficient intensity, the intensity of signal light having the other wavelengths may attenuate such that errors in reception of signal light are caused. Therefore, the optical amplifier is designed and manufactured so as to exhibit a favorable gain characteristic in its signal light wavelength band.

Since the gain characteristic of the optical amplifier also changes depending on temperature, however, even when the optical amplifier is designed and manufactured so as to attain a favorable gain characteristic at a certain temperature, its gain characteristic will deteriorate if the temperature in use changes. In order to eliminate such a problem, there are some known techniques have been known for maintaining the gain characteristic of the optical amplifier.

For example, according to the technique disclosed in Japanese Patent Application Laid-Open No. HEI 4-11794, a temperature control device such as Peltier device is employed so as to control the temperature of the amplifying optical fiber or the like constituting the optical amplifier to keep it constant, thereby maintaining the gain characteristic of the optical amplifier. According to the technique disclosed in Japanese Patent Application Laid-Open No. HEI 5-82873, on the other hand, the amplifying optical fiber constituting the optical amplifier is made shorter, so as to reduce the change in gain characteristic with respect to the change in temperature.

SUMMARY OF THE INVENTION

The inventors found out that the above-mentioned conventional examples have their respective problems as follows. Namely, the technique described in Japanese Patent Application Laid-Open No. HEI 4-11794 is problematic in that its power consumption is high due to the use of the temperature control device such as Peltier device. According to a trial calculation, the additional power consumption per Peltier device is about 5 W. For releasing the heat generated thereby, the housing for accommodating the optical amplifier has to be made greater.

Further the inventors found out in the technique described in Japanese Patent Application Laid-Open No. HEI 5-82873 that although the change in absolute value of gain becomes smaller, the wavelength characteristic of gain changes, whereby the transmission characteristic would deteriorate in the WDM transmission in which the gain deviation is required to be smaller and the optical analog transmission in which the gain slope is needed to be smaller.

So, the inventors, in order to eliminate the above-mentioned problems, created the present invention.

It is an object of the present invention to provide an optical amplifier which has a low power consumption and exhibits a minimized change in gain characteristic along with changes in temperature.

The optical amplifier in accordance with the present invention comprises: (1) an optical waveguide for amplifying signal light incident thereon while pumping light is being supplied, and outputting thus amplified signal light; (2) a transmission device, substantially cascaded to the optical waveguide, for transmitting therethrough the signal light with a predetermined transmission characteristic; (3) pumping means for outputting the pumping light and supplying the pumping light to the optical waveguide; (4) temperature detecting means for detecting a temperature of or near the optical waveguide; and (5) control means for controlling the transmission characteristic of the transmission device according to the temperature detected by the temperature detecting means.

The signal light fed into the optical amplifier is outputted by way of the optical waveguide and the transmission device. Here, the optical waveguide amplifies the signal light as the pumping light is supplied thereto by the pumping means, whereas the transmission device transmits therethrough the signal light with the transmission characteristic controlled by the control means. Also, the transmission characteristic of the transmission device is controlled according to the temperature of or near the optical waveguide detected by the temperature detecting means. As a consequence, the optical amplifier has a gain which is the combination of the transmission loss in the transmission device and the gain in the optical waveguide, thereby alleviating the change in total gain caused by changes in temperature.

The optical waveguide may be an optical fiber. In this case, the connection loss with respect to optical fiber lines is low. The optical waveguide may be doped with Er element as a material exhibiting an optically amplifying effect. In this case, signal light in the wavelength band of 1.55 $\mu$m, which is most commonly used for optical communications, is amplified.

The transmission device may be a variable optical attenuator, disposed in front of or within the optical waveguide, having a transmission characteristic with a uniform dependence of transmission loss on wavelength and a variable magnitude of transmission loss. In this case, as temperature changes, the intensity of the whole signal light fed into the optical waveguide changes, thereby improving population inversion in the optical waveguide, and also improving the gain characteristic of the optical amplifier.

The transmission device may be a Fabry-Perot resonator having a variable resonator length and a transmission characteristic corresponding to the resonator length. In this case, the change in gain in the optical waveguide caused by a change in temperature is canceled by the change in transmission characteristic in the Fabry-Perot resonator, whereby the gain characteristic of the optical amplifier is improved.

DESCRIPTION OF THE PREFERRED EMBODIMENTS

In the following, embodiments of the present invention will be explained in detail with reference to the accompanying drawings. Here, in the explanation of the drawings, constituents identical to each other will be referred to with numerals or letters identical to each other, without repeating their overlapping descriptions. Also, the present invention will be explained in terms of an optical fiber amplifier which is one of optical amplifiers.

First Embodiment

Figure 1:
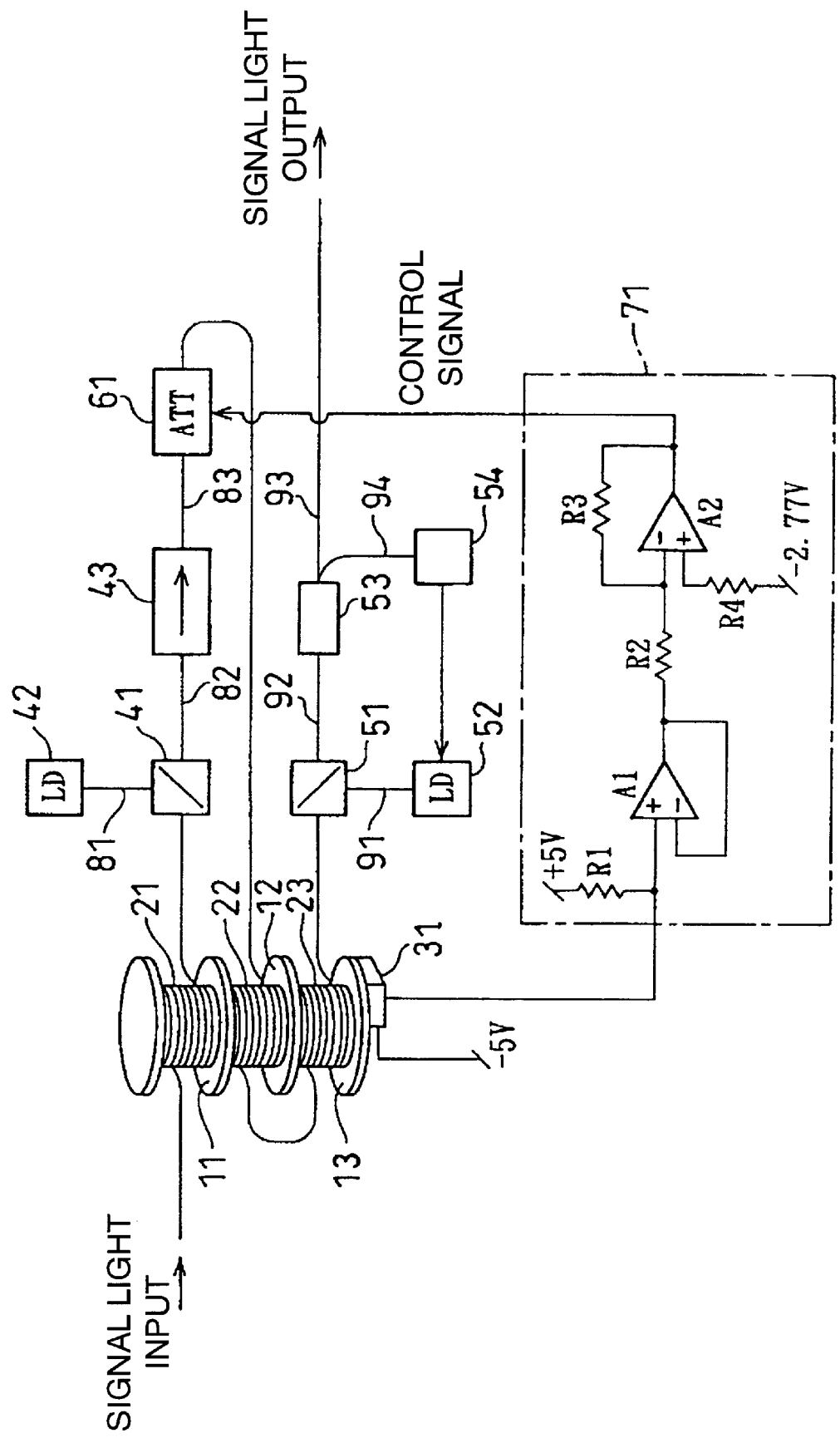
FIG. 1 is a configurational view of the optical fiber amplifier in accordance with the first embodiment.

To begin with, a first embodiment will be explained. FIG. 1 is a configurational view of the optical fiber amplifier in accordance with the first embodiment.

In this optical fiber amplifier, EDFs 21, 22, and 23 wound around aluminum bobbins 11, 12, and 13, respectively, are substantially cascaded to one another in this order. The aluminum bobbins 11, 12, and 13 are stacked one after another in succession and screwed together while in close contact with one another.

The EDF 21 amplifies signal light (in the wavelength band of 1.55 μm) fed to its input end and outputs thus amplified signal light to its output end while a predetermined wavelength of pumping light is being supplied thereto. A WDM coupler 41 is connected to the output end of the EDF 21. The WDM coupler 41 inputs the pumping light having reached there by way of an optical fiber 81 from an pumping light source (e.g., semiconductor laser light source) 42, and supplies this pumping light to the EDF 21, while outputting toward an optical isolator 43 the signal light outputted from the EDF 21. The optical isolator 43 transmits therethrough toward a variable optical attenuator 61 the light having arrived by way of an optical fiber 82 from the WDM coupler 41, while blocking light in the opposite direction. The variable optical attenuator 61 has a variable transmission characteristic, and transmits therethrough, with a transmission loss corresponding to this transmission characteristic, the signal light having reached there by way of an optical fiber 83 from the optical isolator 43. The output end of the variable optical attenuator 61 is connected to the input end of the EDF 22.

The EDF 22 and the EDF 23 are cascaded to each other. They amplify signal light fed to the input end of the EDF 22 while a predetermined wavelength of pumping light is being supplied thereto, and output thus amplified signal light to the output end of the EDF 23. A WDM coupler 51 is connected to the output end of the EDF 23. The WDM coupler 51 inputs the pumping light having reached there by way of an optical fiber 91 from an pumping light source (e.g., semiconductor laser light source) 52, supplies this pumping light to each of the EDFs 23 and 22, and outputs toward a signal light output branching coupler 53 the signal light outputted from the EDF 23. The signal light output branching coupler 53 inputs the signal light having reached there by way of an optical fiber 92 from the WDM coupler 51, causes a part thereof to branch off toward a feedback circuit 54, and outputs the remainder as output signal light of the optical fiber amplifier by way of an optical fiber 93.

The feedback circuit 54 receives signal light having reached there by way of an optical fiber 94 from the signal light output branching coupler 53, detects its light intensity, and controls, according to thus detected light intensity, the intensity of the pumping light outputted from the pumping light source 52. Namely, a feedback loop constituted by the WDM coupler 51, the signal light output branching coupler 53, the feedback circuit 54, and the pumping light source 52 keeps the intensity of signal light outputted from the optical fiber amplifier constant.

On the other hand, a thermistor 31 is bonded to the surface of the aluminum bobbin 13. The resistance value of the thermistor 31 changes depending on temperature. The output terminal of the thermistor 31 is connected to the input terminal of a control circuit 71. The control circuit 71 controls the transmission characteristic of the variable optical attenuator 61 according to the temperature measured by the thermistor 31.

The control circuit 71 is constituted by resistors R1 to R4, and operational amplifiers A1 and A2. The resistor R1 and the thermistor 31 are cascaded to each other, a voltage of +5 V is applied to the other end of the resistor R1, and a voltage of −5 V is applied to the other end of the thermistor 31. The "+" input terminal of the operational amplifier A1 is connected to the junction between the resistor R1 and the thermistor 31, whereas its "−" input terminal is directly connected to its own output terminal. The "−" input terminal of the operational amplifier A2 is connected to the output terminal of the operational amplifier A1 by way of the resistor R2, and also to its own output terminal by way of the resistor R3. A voltage of −2.77 V is applied to the "+" input terminal of the operational amplifier A2 by way of the resistor R4. The control circuit 71 outputs, as a control signal for controlling the transmission characteristic of the variable optical attenuator 61, the signal outputted from the output terminal of the operational amplifier A2.

Thus configured optical fiber amplifier operates as follows. The pumping light outputted from the pumping light source 42 is supplied to the EDF 21 by way of the WDM coupler 41, whereas the pumping light outputted from the pumping light source 52 is supplied to each of the EDFs 23 and 22 by way of the WDM coupler 51. The change in resistance value of the thermistor 31 caused by a change in ambient temperature of the EDFs 21 to 23 is detected by the control circuit 71, and a control signal corresponding to the temperature change is outputted.

When signal light is fed into the optical fiber amplifier here, the signal light is initially amplified by and outputted from the EDF 21, and then is fed into the variable optical attenuator 61 by way of the WDM coupler 41 and the optical isolator 43 in succession. The signal light fed into the variable optical attenuator 61 incurs a predetermined transmission loss according to the transmission characteristic controlled by the control signal outputted from the control circuit 71, and then is fed into the EDF 22. Further, the signal light is amplified and outputted as being propagated through each of the EDFs 22 and 23, and then is fed into the signal light output branching coupler 53 by way of the WDM coupler 51.

Most of the signal light fed into the signal light output branching coupler 53 is outputted as the output of the optical fiber amplifier, whereas a part thereof is fed into the feedback circuit 54, so that its light intensity is detected. The intensity of pumping light outputted from the pumping light source 52 is controlled such that the intensity of signal light detected by the feedback circuit 54 becomes constant, and this pumping light is supplied to each of the EDFs 23 and 22 by way of the WDM coupler 51. Namely, the intensity of signal light outputted from the optical fiber amplifier is kept constant.

Thus, the temperature in the vicinity of the EDFs 21 to 23 is detected by the control circuit 71 as a change in resistance value of the thermistor 31, whereas the transmission loss of the variable optical attenuator 61 is controlled by the control signal outputted from the control circuit 71. Since the signal light incurs a predetermined transmission loss due to the variable optical attenuator 61, the change in gain characteristic of the optical fiber amplifier caused by the temperature change is suppressed.

More specific examples and results of experiments concerning the optical fiber amplifier in accordance with this embodiment will now be explained.

The EDFs 21, 22, and 23 used here have values of concentration of each dopant element, absorption peak at 1.53 μm, and length shown in the following Table.

TABLE 1

|  | EDF21 | EDF22 | EDF23 |
|---|---|---|---|
| Er concentration (wt. ppm) | 1000 | 1000 | 1000 |
| Al concentration (wt. %) | 1.4 | 0.8 | 1.4 |
| P concentration (wt. %) | 0 | 5.0 | 0 |
| absorption peak at 1.53 μm (db/m) | 6.0 | 4.5 | 6.0 |
| length of EDF (m) | 6.5 | 4.0 | 12.0 |

The resistance value R (kΩ) of the thermistor 31 is represented as a function of temperature T (K) by the following expression:

$$R = R0 \cdot \exp[B(1/T - 1/T0)] \quad (1)$$

where R0 is 10 kΩ, B is 3400 K, and T0 is 298 K.

The pumping light source 42 is a semiconductor laser light source which emits laser light having a wavelength of 0.98 μm, whereas the intensity of pumping light supplied to the EDF 21 is set to 40 mW. On the other hand, the pumping light source 52 is a semiconductor laser light source which emits laser light having a wavelength of 1.48 μm.

Figure 2:
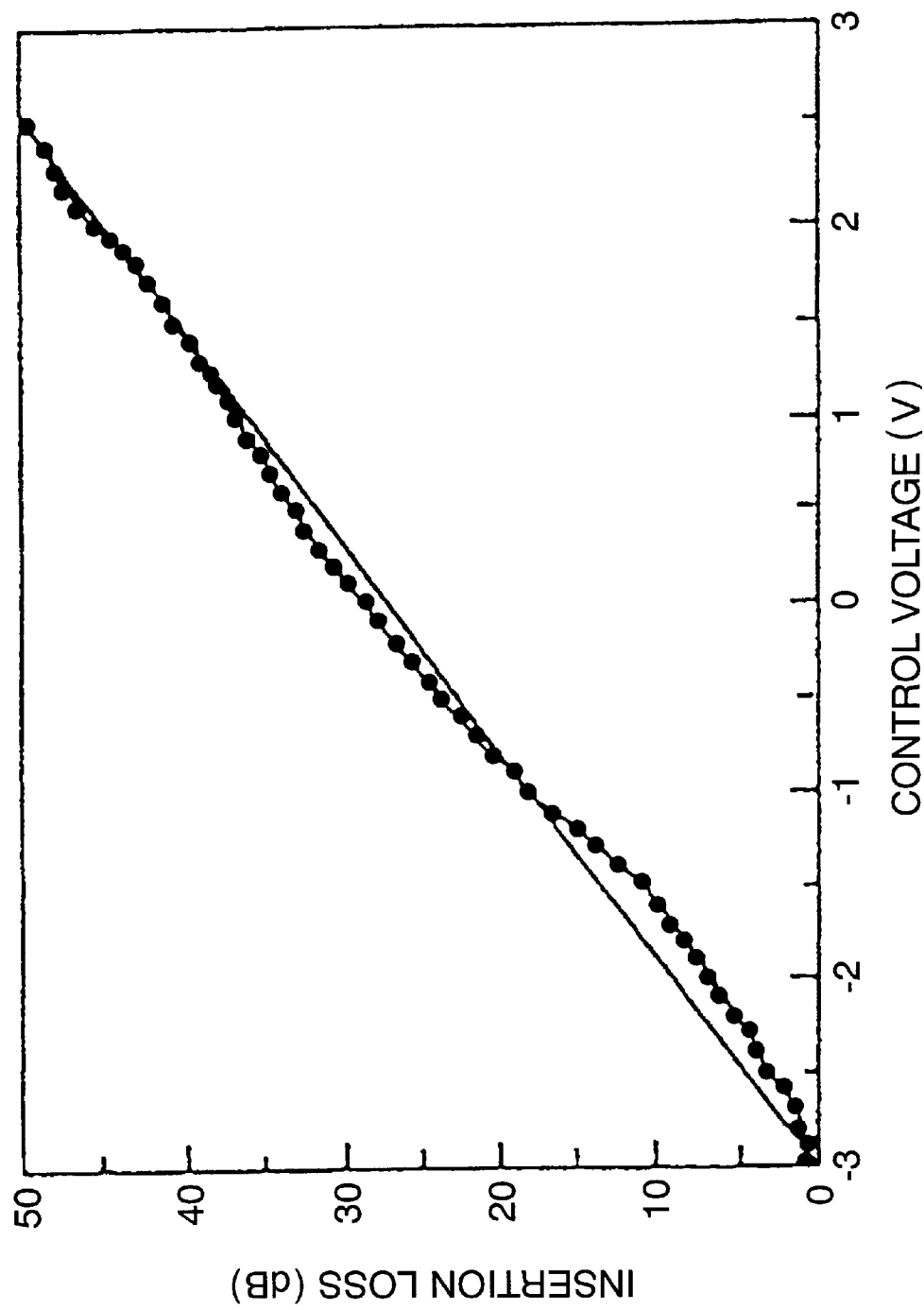
FIG. 2 is a graph showing the relationship between the voltage value of control signal in the variable optical attenuator 61 and the transmission loss (insertion loss)

As the variable optical attenuator 61, OVA-610 manufactured by Santec Corporation was used. FIG. 2 is a graph showing the relationship between the voltage value of control signal and the transmission loss (insertion loss) in this case. As shown in this graph, the dB value of transmission loss has substantially a linear relationship with the voltage value of control signal. Also, when the voltage value of control signal is −3 V or slightly greater, the transmission loss is small. Therefore, the variable optical attenuator 61 is used here in this range where the transmission loss is small.

In the control circuit 71, the resistance values of the resistors R1, R2, R3, and R4 are 4 kΩ, 20 kΩ, 1 kΩ, and 20 kΩ, respectively.

The signal light fed into this optical fiber amplifier is an eight-wave WDM signal whose wavelength ranges from 1544 to 1558 nm at intervals of 2 nm. Each wavelength has an intensity of −20 dBm, and the whole signal light intensity is −11 dBm.

Figure 3:
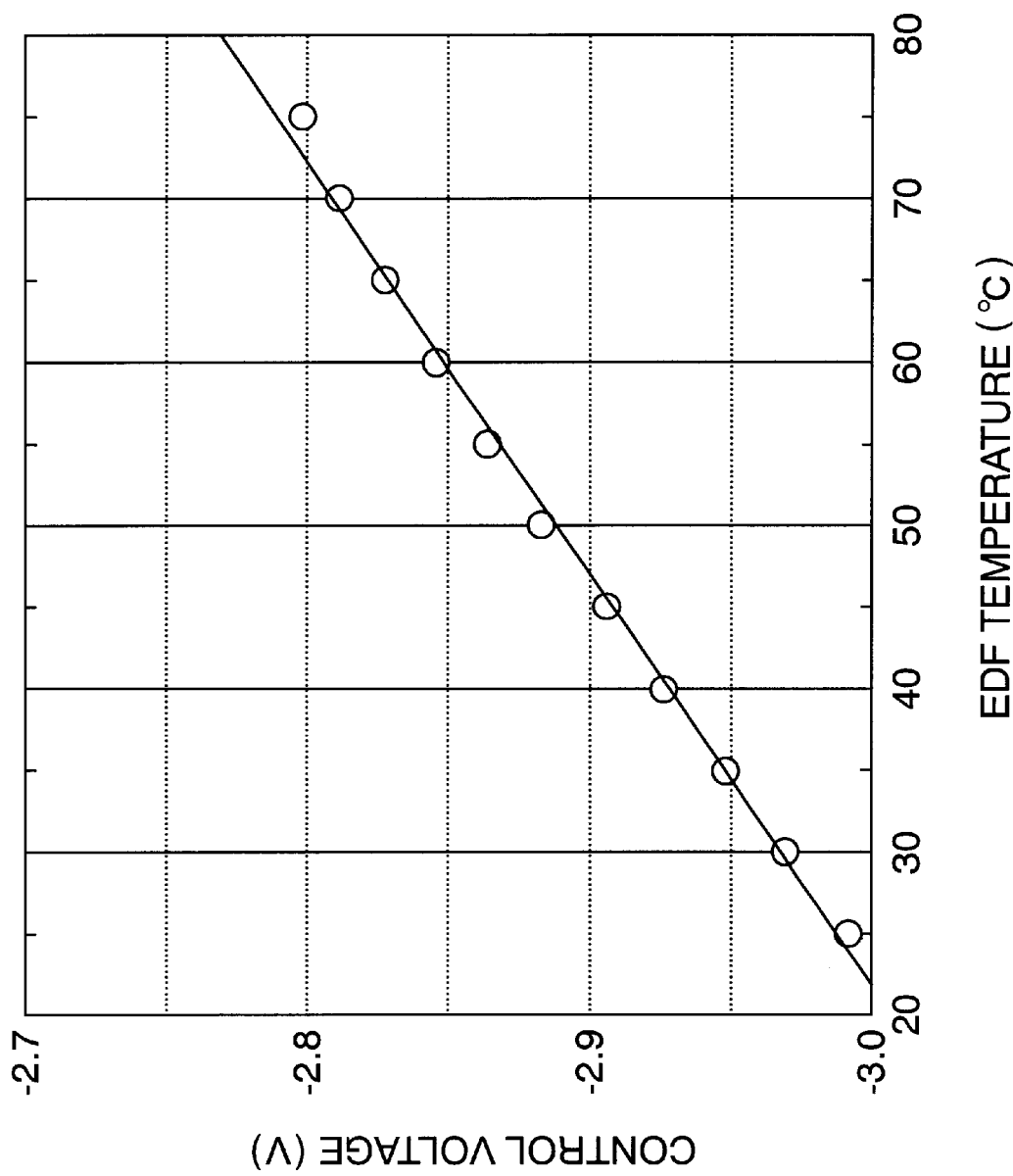
FIG. 3 is a graph showing the relationship between the temperature of EDFs 21 to 23 and the voltage value of control signal outputted from the control circuit 71.

In thus constructed optical fiber amplifier, the voltage value of control signal fed into the variable optical attenuator 61 from the control circuit 71 has the relationship shown in FIG. 3 with individual temperatures of the EDFs 21 to 23. Therefore, the transmission loss (insertion loss) in the variable optical attenuator 61 with respect to the individual temperatures of the EDFs 21 to 23 can be obtained from FIGS. 2 and 3. Namely, for example, when the temperature of the EDFs 21 to 23 changes within the range of 25° C. to 75° C., the voltage value of control signal outputted from the control circuit 71 changes within the range of about −3.0 to −2.8 V (FIG. 3), and the transmission loss (insertion loss) in the variable attenuator 61 changes within the range having a width of about 1.3 dB (FIG. 2).

Figure 4:
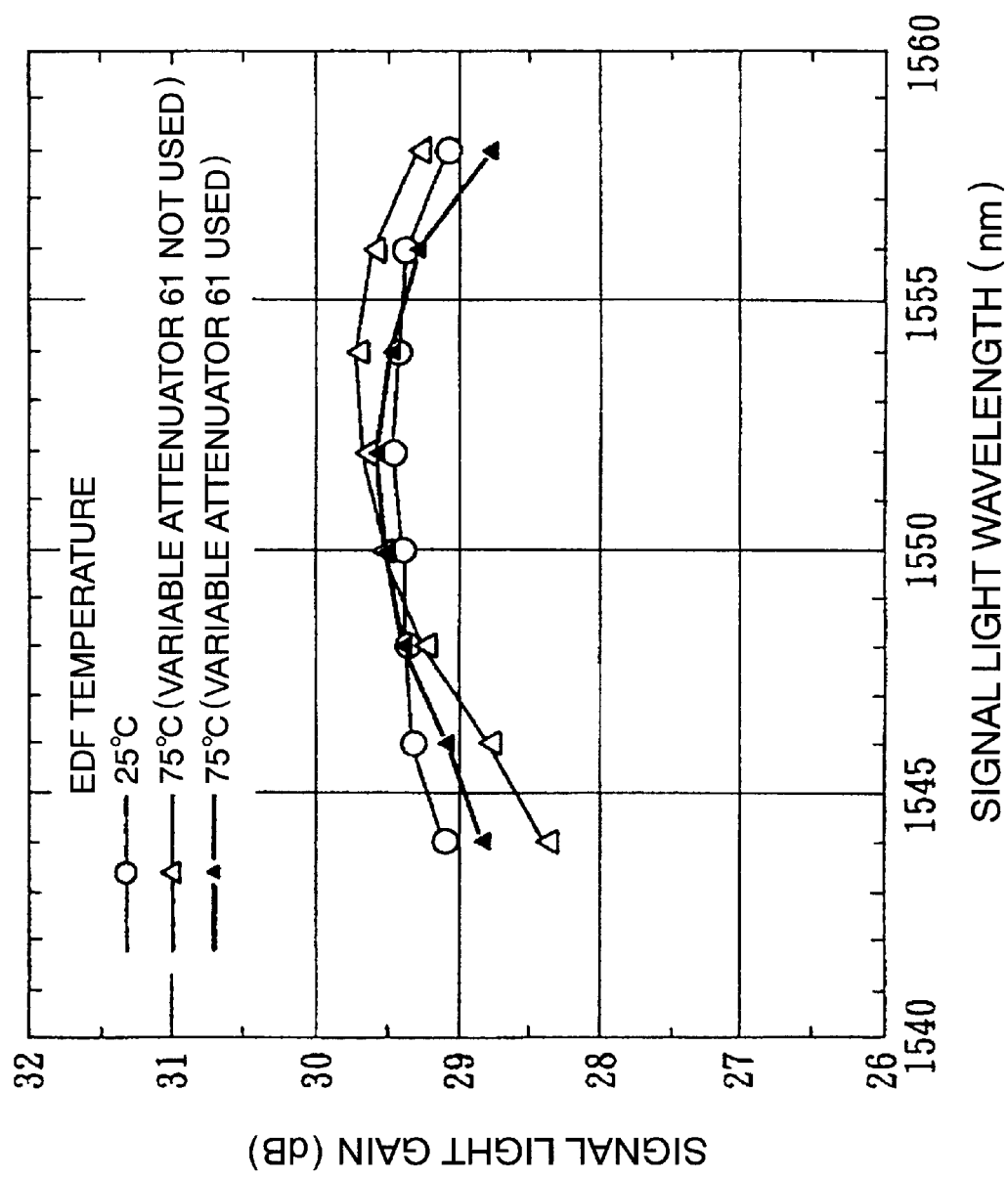
FIG. 4 is a graph showing the gain characteristics of the optical fiber amplifier in the respective cases where the temperature of EDFs 21 to 23 is 25° C. and 75° C. in the first embodiment.

FIG. 4 is a graph showing the gain characteristics of the optical fiber amplifier in the respective cases where the temperature of the EDFs 21 to 23 is 25° C. and 75° C. Also, this graph shows the respective gain characteristics when the variable optical attenuator 61 is used and not used in the case where the temperature is 75° C.

As can be seen from this graph, the intensity of the whole signal light outputted from the optical fiber amplifier is substantially identical among the cases where the temperature is 25° C. (plotted with white circles), where the temperature is 75° C. without the variable optical attenuator 61 being used (plotted with white triangles), and where the temperature is 75° C. with the variable optical attenuator 61 being used (plotted with black triangles). Namely, regardless of whether the variable optical attenuator 61 is used or not, the intensity of the whole signal light outputted from the optical fiber amplifier is kept constant even if temperature changes. It is due to the fact that the intensity of pumping light supplied to each of the EDFs 23 and 22 from the pumping light source 52 changes from 70 mW at the temperature of 25° C. to 77 mW at the temperature of 75° C. under the action of the feedback circuit 54 or the like.

When the variable optical attenuator 61 is not used, however, the gain deviation (difference between the maximum and minimum values of gain among individual signal light components) is 0.34 dB at the temperature of 25° C. and 1.36 dB at 75° C. Namely, in the case where the variable optical attenuator 61 is not used, the gain characteristic of the optical fiber amplifier greatly deteriorates when the temperature rises from 25° C. to 75° C. By contrast, when the variable optical attenuator 61 is in use, the gain deviation at the temperature of 75° C. is 0.79 dB. That is, using the variable optical attenuator 61 alleviates the deterioration in the gain characteristic of the optical fiber amplifier caused by changes in temperature.

The improvement in gain characteristic of the optical fiber amplifier due to the use of the variable optical attenuator 61 can be explained as follows. Namely, as the temperature of the EDFs 21 to 23 rises from 25° C. to 75° C., the transmission loss in the variable optical attenuator 61 controlled by the control circuit 71 increases by about 1.3 dB, whereby the intensity of signal light fed into each of the EDFs 22 and 23 located downstream therefrom decreases. As a result, population inversion is improved in the EDFs 22 and 23, and the gain characteristic is also improved.

Here, since the signal light incurs a transmission loss due to the variable optical attenuator 61, it is necessary to enhance the gain in the EDFs 22 and 23 so as to compensate for this transmission loss, whereby the intensity of pumping light supplied to each of the EDFs 23 and 22 from the pumping light source 52 increases to 85 mw.

The power consumption of the optical fiber amplifier in accordance with this embodiment will now be compared with that in the prior art described in Japanese Patent Application Laid-Open No. HEI 4-11794. In the prior art, the power consumption of the pumping light source 42 is 0.2 A at most, the power consumption of the pumping light source 52 is 0.6 A at most, and the current consumption per Peltier device is about 1 A. Taking account of the current consumption in the other circuit portion, and assuming that the Peltier device is driven by a single power source of 5 V, the use of Peltier device increases the power consumption of the optical fiber amplifier from 14.5 W by 5 W, thus making it reach 19.5 W. In the optical fiber amplifier in accordance with this embodiment, by contrast, the current consumption increases by only 0.05 A or less in the control circuit 71.

(Second Embodiment)

Figure 5:
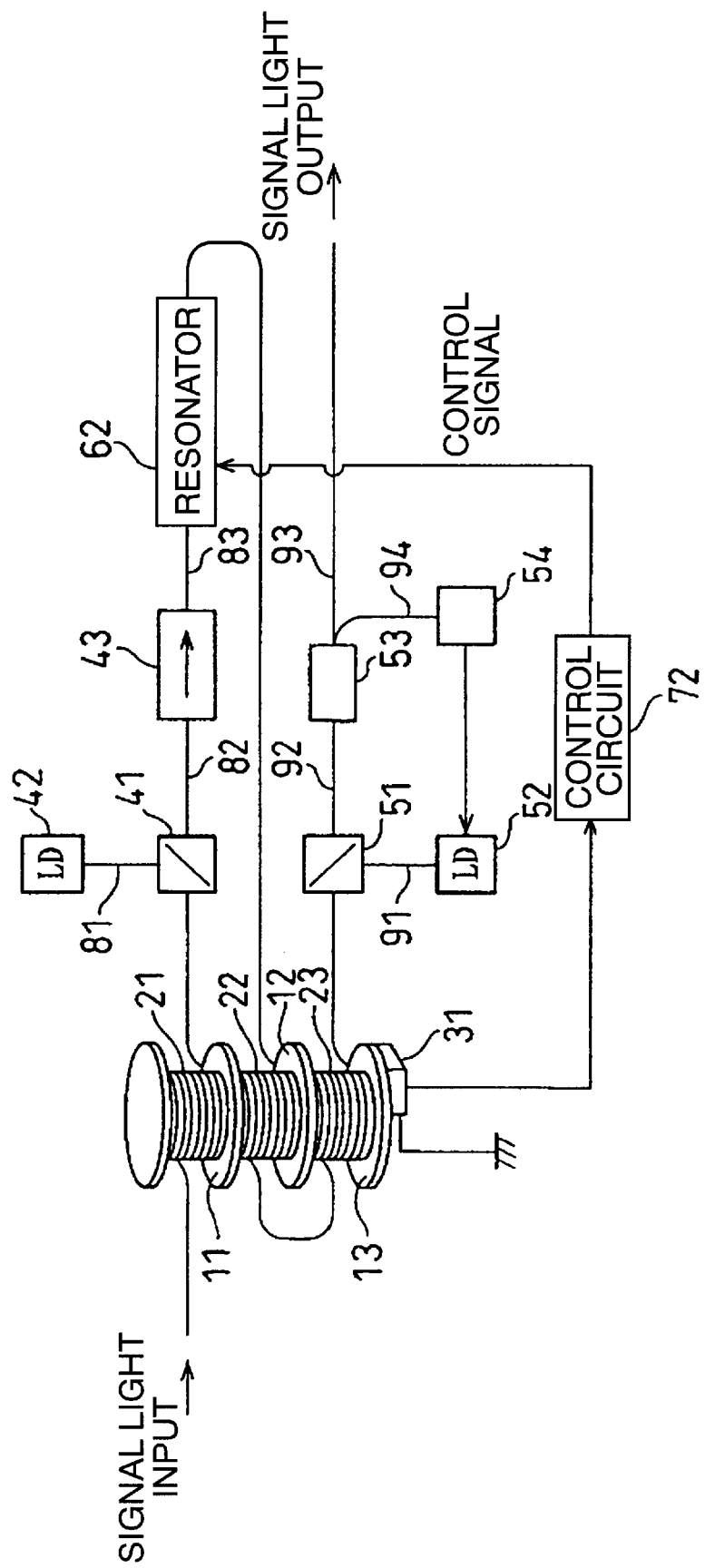
FIG. 5 is a configurational view of the optical fiber amplifier in accordance with the second embodiment.

A second embodiment will now be explained. FIG. 5 is a configurational view of the optical fiber amplifier in accordance with the second embodiment. The optical fiber amplifier in accordance with this embodiment differs from that of the first embodiment in that a Fabry-Perot resonator 62 is provided in place of the variable optical attenuator 61, and in that a control circuit 72 for controlling the resonator length of the Fabry-Perot resonator 62 is provided in place of the control circuit 71. Here, the other constituents referred to with the numerals identical to those in FIG. 1 are similar to those in the first embodiment.

Figure 6:
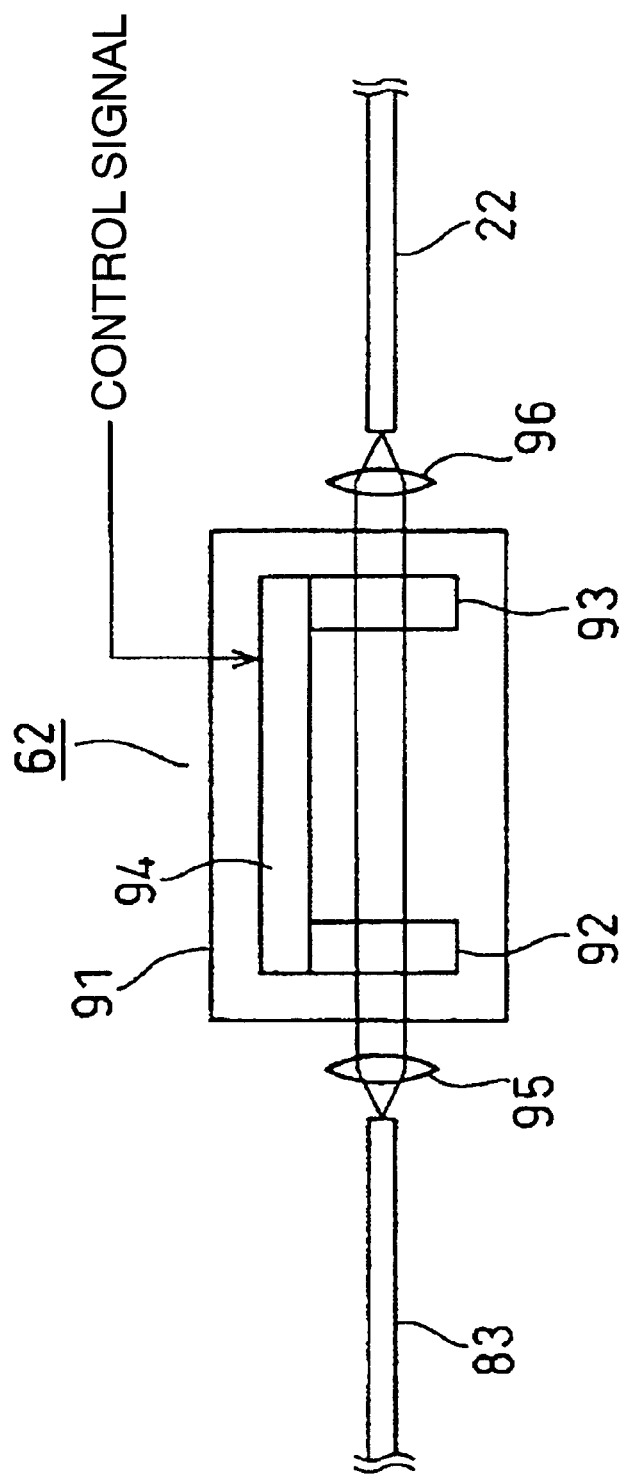
FIG. 6 is a configurational view of the Fabry-Perot resonator 62.

FIG. 6 is a configurational view of the Fabry-Perot resonator 62. This Fabry-Perot resonator 62 comprises a housing 91 in which two optical crystals 92 and 93 are secured to a piezoelectric element 94. The optical crystals 92 and 93 are disposed parallel to each other, so as to constitute a resonator, whose resonator length changes in response to the voltage value of control signal applied to the piezoelectric element 94 from the control circuit 72.

The signal light from the optical isolator 43 outputted from the output end of the optical fiber 83 by way thereof successively travels through a lens 95, the Fabry-Perot resonator 62, and a lens 96, so as to be fed to the entrance end of the EDF 22. Here, the transmission characteristic T of signal light in the Fabry-Perot resonator 62 is represented by:

[Expression 2]

$$T = \left[1 + \frac{2R}{(1-R)^2}\left(1 - \cos\frac{4\pi \cdot n \cdot d \cdot \cos\theta}{\lambda}\right)\right]^{-1} \quad (2)$$

where $\lambda$ is the wavelength of signal light, R is the power reflectivity of the Fabry-Perot resonator 62, $\theta$ is the incident angle of signal light with respect to the optical crystal 92, n is the refractive index of the medium in the space between the optical crystals 92 and 93, and d is the resonator length of the Fabry-Perot resonator 62. Among them, each of the power reflectivity R, incident angle $\theta$, and refractive index n is a fixed value, whereby the transmission characteristic T is a function of the signal light wavelength $\lambda$ and resonator length d.

The resonator length d of the Fabry-Perot resonator 62 is controlled by a control signal outputted from the control circuit 72, whereas the voltage value of this control signal corresponds to the temperature of the EDFs 21 to 23 detected by the thermistor 31. Hence, the resonator length d changes in response to the temperature of the EDFs 21 to 23.

Figure 7:
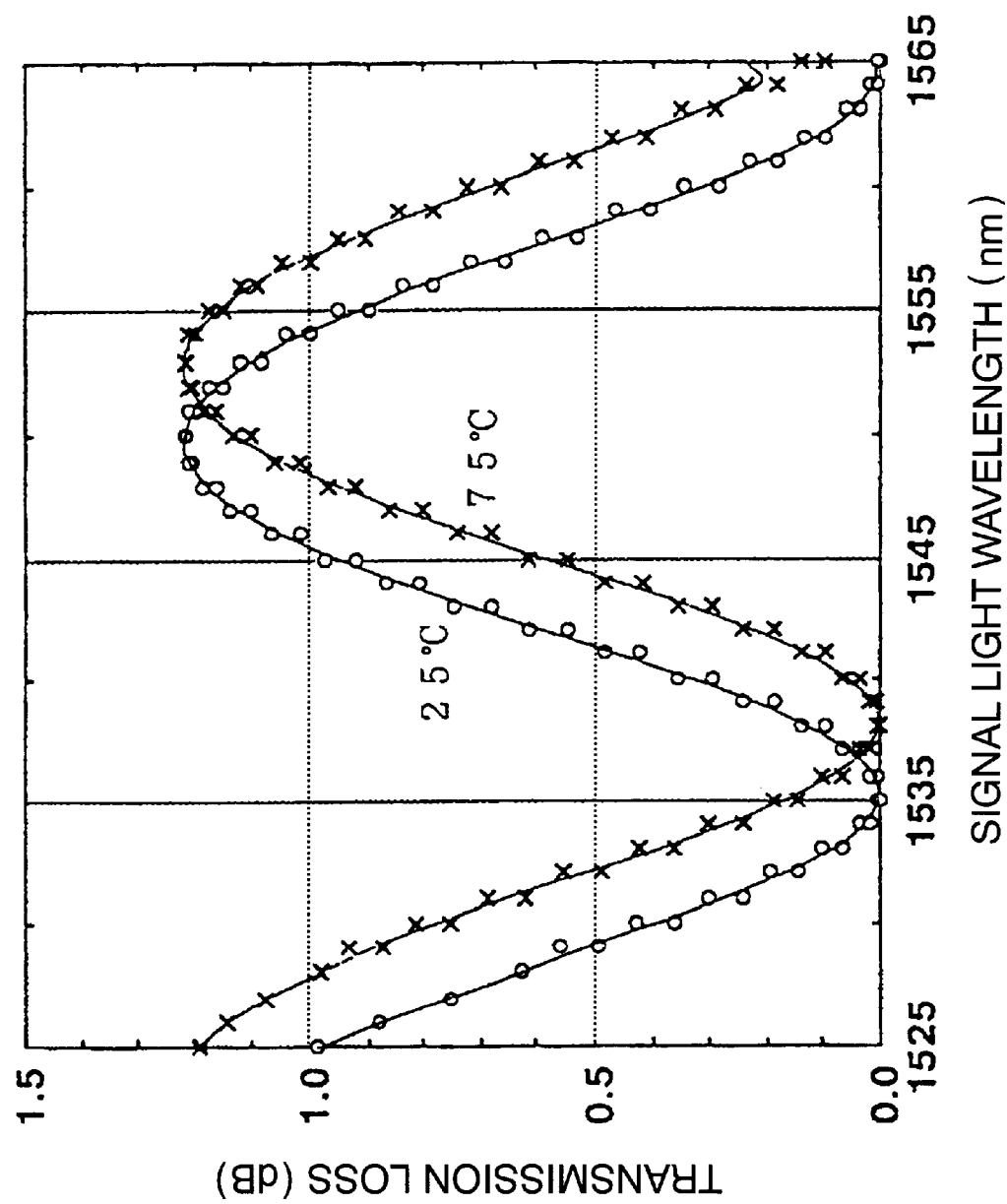
FIG. 7 is a graph showing the transmission characteristic of the Fabry-Perot resonator 62.

In this embodiment, the power reflectivity R was 0.07, the incident angle $\theta$ was zero degree, and the refractive index n was 1. Also, the voltage value of control signal applied to the piezoelectric element 94 from the control circuit 72 was adjusted such that the resonator length d became 40.678 $\mu$m and 40.757 $\mu$m at temperatures of 25° C. and 75° C., respectively. FIG. 7 is a graph showing the transmission characteristic of this Fabry-Perot resonator 62. As shown in this graph, the transmission loss of the Fabry-Perot resonator 62 changes in a cycle of about 30 nm with respect to the signal light wavelength $\lambda$. Also, while the transmission loss attains its peak near a signal light wavelength of 1550 nm when the temperature is 25° C., the transmission loss peak is near a signal light wavelength of 1553 nm when the temperature is 75° C. Namely, the transmission loss at the temperature of 75° C. shifts from that at the temperature of 25° C. by about 3 nm in the positive direction (rightward direction) of the wavelength axis.

Figure 8:
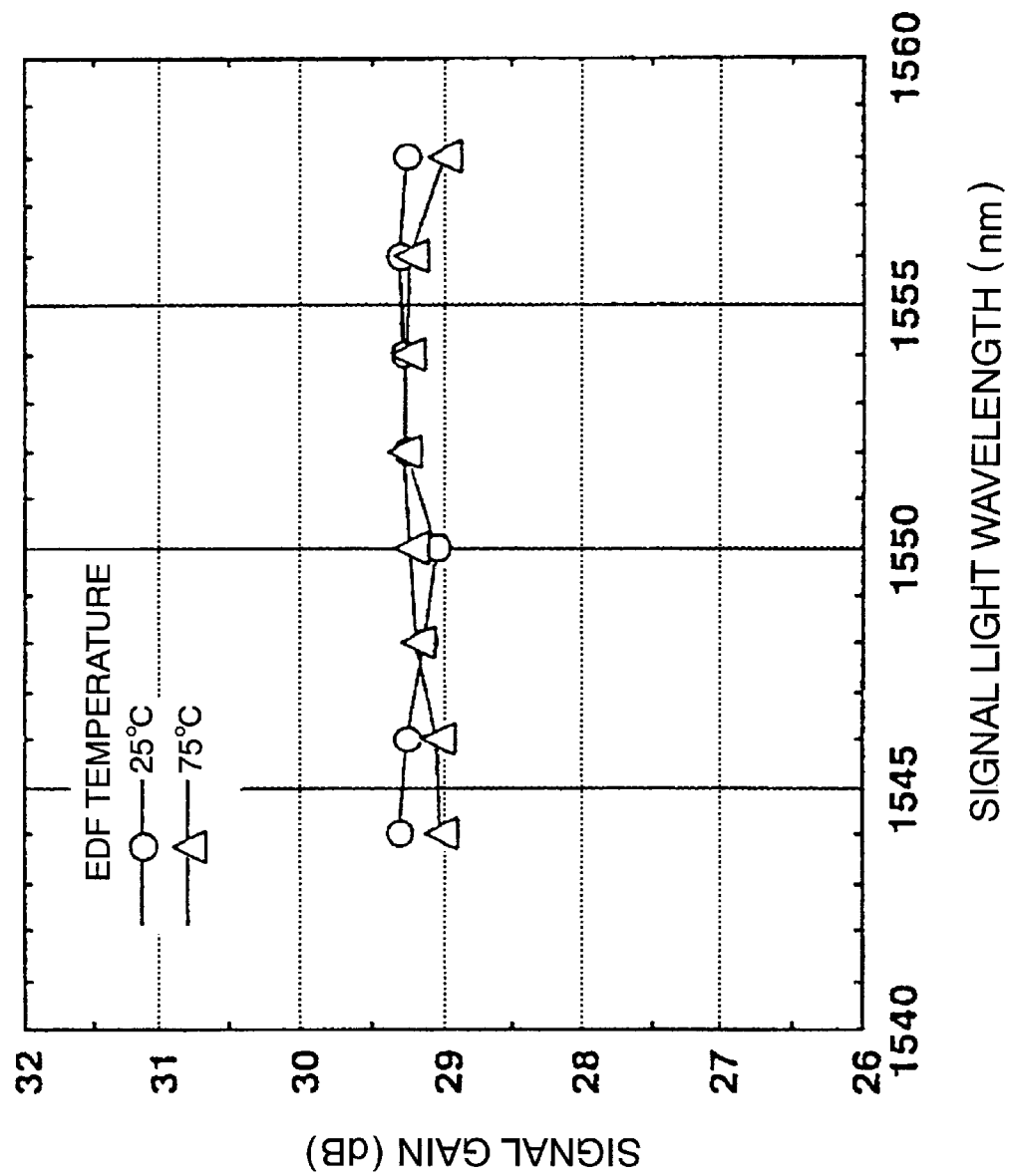
FIG. 8 is a graph showing the gain characteristics of the optical fiber amplifier in the respective cases where the temperature of EDFs 21 to 23 is 25° C. and 75° C. in the second embodiment.

FIG. 8 is a graph showing the gain characteristics of the optical fiber amplifier in the respective cases where the temperature of the EDFs 21 to 23 is 25° C. and 75° C. As can be seen from this graph, the intensity of the whole signal light outputted from the optical fiber amplifier is substantially identical between the cases where the temperature is 25° C. (plotted with white circles) and where the temperature is 75° C. (plotted with white triangles). Namely, the intensity of the whole signal light outputted from the optical fiber amplifier is kept constant even if temperature changes. Here, in this embodiment, the transmission loss of the whole signal light in the Fabry-Perot resonator 62 would not change even if the temperature changes. Hence, the intensity of pumping light supplied to each of the EDFs 23 and 22 from the pumping light source 52 remains at 77 mW. Also, while the gain deviation of the optical fiber amplifier is 0.25 dB at the temperature of 25° C., it becomes 0.27 dB at the temperature of 75° C., whereby the deterioration in the gain characteristic of the optical fiber amplifier caused by the change in temperature is alleviated.

The improvement in gain characteristic of the optical fiber amplifier due to the use of the Fabry-Perot resonator 62 can be explained as follows. Namely, as the temperature of the EDFs 21 to 23 rises from 25° C. to 75° C., the transmission loss in the Fabry-Perot resonator 62 controlled by the control circuit 72 shifts. This shift in transmission loss acts so as to cancel the gain characteristic change in each of the EDFs 21 to 23, whereby the gain characteristic of the optical fiber amplifier is improved.

Also, in the optical fiber amplifier in accordance with this embodiment, the current consumption in the control circuit 72 increases by only 0.05 A or less, and the current consumption in the Fabry-Perot resonator 62 increases by only 0.001 A or less, whereby the increase in power consumption is very small.

Third Embodiment

In the above first and second embodiments, the wavelength of an optical signal to be amplified is 1530–1560 nm, so called as a C-band. But, it is apparent that the present invention can be also applied to the amplification of the optical signal having a wavelength of so called a L-band, that is, 1570 nm to 1600 nm.

Figure 9:
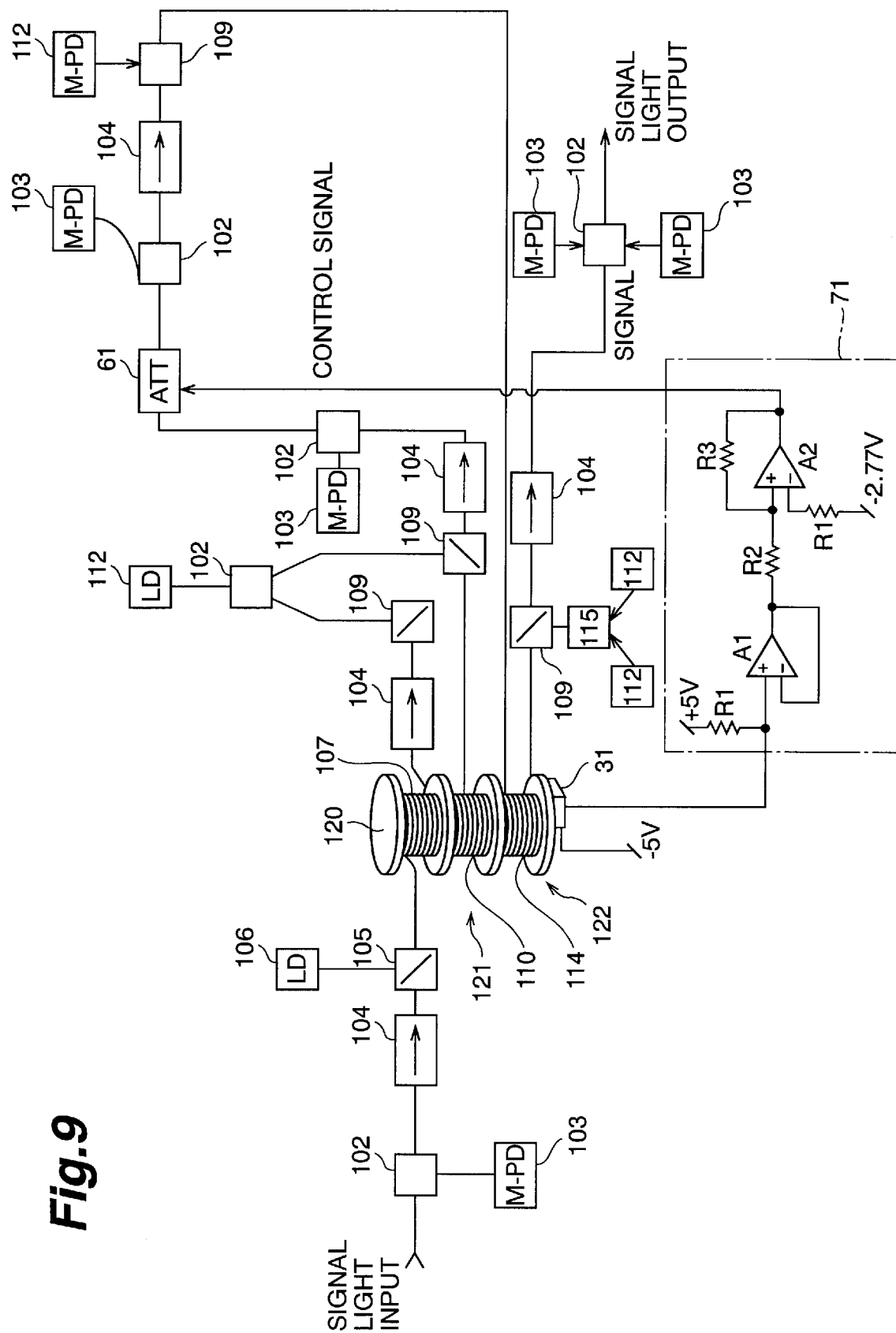
FIG. 9 is a configurational view of the optical fiber amplifier in accordance with the third embodiment.

FIG. 9 shows the third embodiment which is a EDFA for the so-called L band.

In this optical fiber amplifier, EDFs 107, 110 and 114 wound around aluminum bobbins 120, 121, and 122, respectively, are substantially cascaded to one another in this order. This EDFA is used in an ambient temperature from 0 to 60° C., and the range of wavelength of an optical signal to be amplified is 1574.5 nm to 1600.6 nm. Further, the EDFs 121, 122 and 123 are quartz aluminum doped quartz EDFs as used in the first embodiment and absorption at 1530 nm band in the EDFs 107, 110 and 114 are respectively 200 dB, 425 dB and 425 dB. Further total input/output powers of the amplifiers respectively −2 dBm and +21.3 dBm.

The aluminum bobbins 120, 121 and 122 are integrally formed so that the temperatures of EDFs are substantially equal to each other. There may be stacked one after another in succession and screwed together while in close contact with one another in the case that the thermal conduction between these bobbins is kept.

The operation of EDFA of the third embodiment is basically similar to that of the first embodiment and the control circuit 71, the variable optical attenuator 61 and the thermistor 31 are the same as those of the first embodiment.

In the third embodiment, as shown in FIG. 9, 0.98 $\mu$m band Laser Diode is connected to an input end of the EDF 107 wounded on the aluminum bobbin 120 through a 0.98/1.58 $\mu$m band WDM coupler 105 and a 1.48 $\mu$m band Laser Diode 112 is connected to an output end of the EDF 107 through a coupler 102, a 1.48/1.58 $\mu$m WDM coupler 109 and an optical isolator 104. The EDF 107 amplifies a L band signal light (in the wavelength band of 1.58 $\mu$m) fed to its input end and outputs thus amplified signal light to its output end while predetermined wavelengths of pumping light(980 nm band and 1480 nm band) are being supplied thereto. The 1.48 $\mu$m band Laser Diode 112 is connected to an input end of the EDF 110 through a 1.48/1.58 $\mu$m WDM coupler 109 and an output end of the EDF 110 is connected to the 1.48 $\mu$m band Laser Diode 112 through a 1.48/1.58 $\mu$m WDM coupler 109 and the coupler 102 as shown in FIG. 9. The EDF 110 amplifies a L band signal light (in the wavelength band of 1.58 $\mu$m) fed to its input end from the EDF 107 and outputs thus amplified signal light to its output end while predetermined wavelengths of pumping light (1480 nm band) are being supplied thereto. The output end of the EDF 110 is connected to an input end of the variable optical attenuator 61 through an optical isolator 104. An output of the attenuator 61 is connected to an output of a 1.48 $\mu$m band Laser Diode 112 through an optical isolator 104 and a 1.48/1.58 $\mu$m WDM coupler 109. An input end of the EDF 114 is connected to the 1.48 $\mu$m band Laser Diode 112 and an output end of the EDF 114 is connected to output ends of the 1.48 $\mu$m band Laser Diodes 112 through a polarization combiner 115 and a 1.48/1.58 $\mu$m WDM coupler 109. The EDF 114 amplifies a L band signal light (in the wavelength band of 1.58 $\mu$m) fed to its input end from the attenuator 61 and outputs thus amplified signal light to its output end while predetermined wavelengths of pumping light(1480 nm band) are being supplied thereto. Some monitor units including a monitor photo diode 103 and a coupler 102 are inserted into an input and output sides of EDFA and are provided at the input end and the output of the attenuator 61.

A signal light inputted from an input terminal of EDFA is amplified by the EDFs 107, 110 and 114 and outputted to an output terminal of the EDFA.

Figure 10:
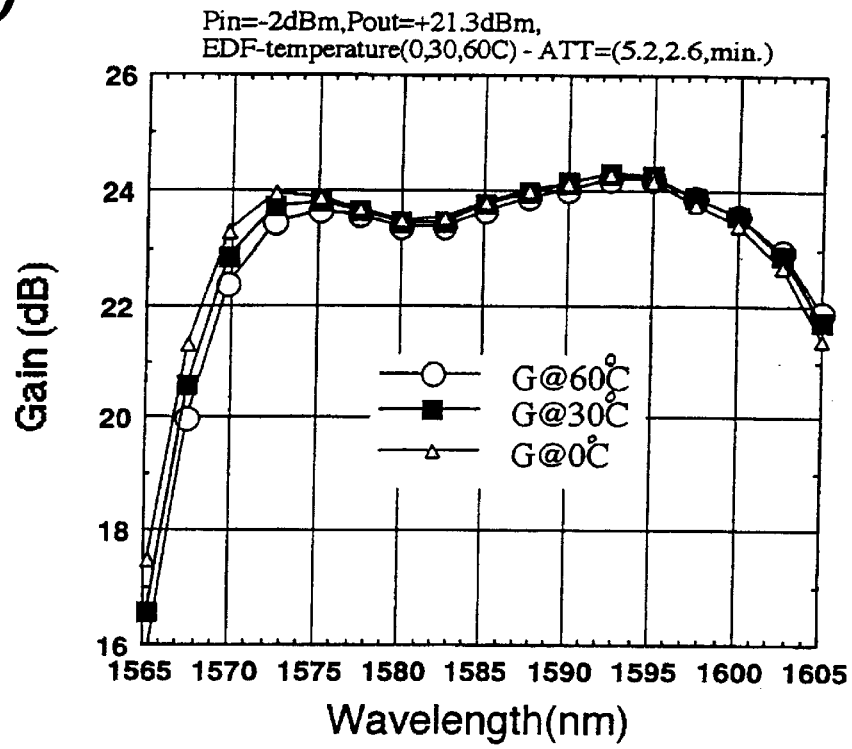
FIG. 10 is a graph showing the gain characteristics of the optical fiber in the respective cases wherein the temperature of EDFs 121 to 123 is 0° C., 30° C. and 60° C. in the third embodiment.
Figure 11:
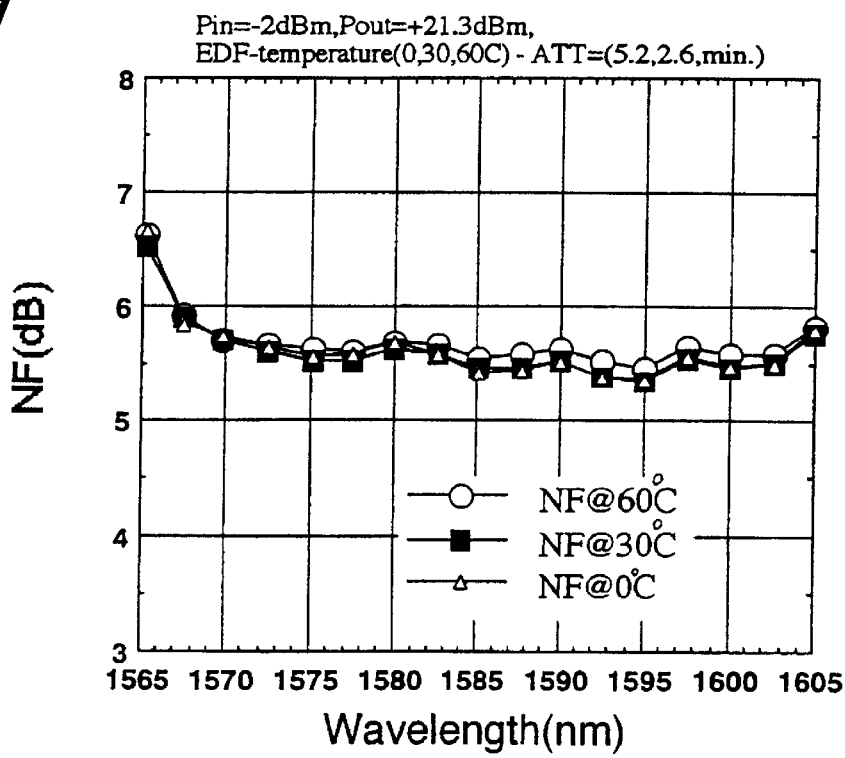
FIG. 11 is a graph showing the NF gain characteristics of the optical fiber in the respective cases wherein the temperature of EDFs 121 to 123 is 0° C., 30° C. and 60° C. in the third embodiment.

A thermistor 31 is bonded to the surface of the aluminum bobbin 122. The resistance value of the thermistor 122 changes depending on temperature. The output terminal of the thermistor 31 is connected to the input terminal of a control circuit 71. The control circuit 71 controls the transmission characteristic of the variable optical attenuator 161 according to the temperature measured by the thermistor 31. The control circuit 71 controls the loss of the variable optical attenuator 61 according to the following equation.

$$\Delta C = (60 - T) * 0.0026 * G_0$$

Wherein $\Delta C$ is variation of loss and the unit of T is °C., $G_0$ is gain of EDF at a center of the range of ambient temperature, and in this case, $G_0$ is about 33.5 dB. In the above third embodiment, the gain and NF (noise figure) are shown in FIGS. 10 and 11 respectively. As shown in FIGS. 10 and 11, even when the ambient temperature changes, the gain spectrum and NF is kept to be substantially constant over the range of wavelength of an optical signal to be amplified.

As to the operation of the third embodiment, it is substantially equal to and anticipated by that of the first embodiment.

Without being restricted to the above-mentioned embodiments, the present invention can be modified in various manners. Though the above-mentioned embodiments relate to optical fiber amplifiers using EDFs, the optical amplifier is not limited thereto. For example, the optical amplifier may use an optical fiber doped with a rare-earth element (e.g., Nd (neodymium) element, Pr (praseodymium) element, or the like) other than Er element as the material having an optically amplifying effect, or a planar optical waveguide in place of the optical fiber.

In accordance with the present invention, as explained in detail in the foregoing, signal light fed into the optical amplifier is outputted by way of an optical waveguide and a transmission device. Here, the optical waveguide amplifies the signal light while pumping light is supplied thereto by pumping means, and the transmission device transmits therethrough the signal light with a transmission characteristic controlled by control means. On the other hand, the transmission characteristic of the transmission device is controlled according to the temperature of or near the optical waveguide detected by temperature detecting means. Therefore, the optical amplifier would have a gain which is the combination of the transmission loss in the transmission device and the gain in the optical waveguide, whereby the change in total gain caused by changes in temperature is alleviated.

In the case where the optical waveguide is an optical fiber, the connection loss with respect to optical fiber lines is low. Also, when the optical waveguide is doped with Er element as the material having an optically amplifying effect, signal light in the wavelength band of 1.55 $\mu$m, which is most commonly used for optical communications, is amplified.

In the case where the transmission device is a variable optical attenuator, disposed in front of or within the optical waveguide, having a uniform dependence of transmission loss on wavelength and a variable magnitude of transmission loss, the intensity of the whole signal light fed into the optical waveguide changes when temperature changes, whereby population inversion in the optical waveguide is improved, and the gain characteristic of the optical amplifier is also improved.

In the case where the transmission device is a Fabry-Perot resonator having a variable resonator length and a transmission characteristic corresponding to the resonator length, on the other hand, the change in gain in the optical waveguide caused by a change in temperature is canceled by the change in transmission characteristic in the Fabry-Perot resonator, whereby the gain characteristic of the optical amplifier is improved.

In accordance with the present invention, as explained in the foregoing, the change in gain of the optical amplifier can be minimized even if temperature changes. Also, the increase in power consumption can be suppressed, whereby the housing size and cost can be suppressed as well.

What is claimed is:

1. An optical amplifier comprising:

an optical waveguide for amplifying signal light incident thereon and outputting thus amplified signal light while pumping light is being supplied;

a transmission device, substantially cascaded to said optical waveguide, for transmitting therethrough said signal light with a predetermined transmission characteristic;

pumping means for outputting said pumping light and supplying said pumping light to said optical waveguide;

temperature detecting means for detecting a temperature of or near said optical waveguide; and control means for controlling the transmission characteristic of said transmission device according to the temperature detected by said temperature detecting means.

2. An optical amplifier according to claim 1, wherein said optical waveguide is an optical fiber.

3. An optical amplifier according to claim 1, wherein said optical waveguide is doped with Er element as a material exhibiting an optically amplifying effect.

4. An optical amplifier according to claim 1, wherein said transmission device is a variable optical attenuator, disposed in front of or within said optical waveguide, having a transmission characteristic with a uniform dependence of transmission loss on wavelength and a variable magnitude of transmission loss.

5. An optical amplifier according to claim 1, wherein said transmission device is a Fabry-Perot resonator having a variable resonator length and a transmission characteristic corresponding to said resonator length.

* * * * *